US012109750B2

(12) United States Patent
Lhomme et al.

(10) Patent No.: US 12,109,750 B2
(45) Date of Patent: Oct. 8, 2024

(54) DEVICE FOR CONTROLLING THE MOVEMENT OF A MOVABLE ELEMENT FOR A MACHINE FOR MANUFACTURING PLASTIC RECEPTACLES

(71) Applicant: SIDEL PARTICIPATIONS, Octeville-sur-Mer (FR)

(72) Inventors: Franck Lhomme, Octeville-sur-Mer (FR); Jocelyn Michel, Octeville-sur-Mer (FR)

(73) Assignee: SIDEL PARTICIPATIONS, Octeville-Sur-Mer (FR)

( * ) Notice: Subject to any disclaimer, the term of this patent is extended or adjusted under 35 U.S.C. 154(b) by 373 days.

(21) Appl. No.: 17/770,378

(22) PCT Filed: Oct. 26, 2020

(86) PCT No.: PCT/EP2020/080017
§ 371 (c)(1),
(2) Date: Apr. 20, 2022

(87) PCT Pub. No.: WO2021/078994
PCT Pub. Date: Apr. 29, 2021

(65) Prior Publication Data
US 2022/0379541 A1 Dec. 1, 2022

(30) Foreign Application Priority Data

Oct. 24, 2019 (FR) ...................................... 1911893

(51) Int. Cl.
*B29C 31/08* (2006.01)
*B29C 49/42* (2006.01)
(Continued)

(52) U.S. Cl.
CPC ...... *B29C 49/42378* (2022.05); *B29C 31/085* (2013.01); *B29C 49/42382* (2022.05);
(Continued)

(58) Field of Classification Search
CPC ...................................................... B29C 49/00
See application file for complete search history.

(56) References Cited

U.S. PATENT DOCUMENTS 7,581,635 B2 * 9/2009 Lecomte ................ B65G 33/02
198/474.1
7,621,738 B2 * 11/2009 Doudement ......... B65G 17/323
198/470.1
(Continued)

FOREIGN PATENT DOCUMENTS

CN 208223442 U 12/2018
DE 102008010885 A1 8/2009
(Continued)

OTHER PUBLICATIONS

International search report dated Jan. 28, 2021.

*Primary Examiner* — Atul P. Khare

(57) ABSTRACT

A plastic container manufacturing machine, comprising a chassis having a camway with a cam and a countercam and an element which is movable relative to the chassis, bearing a roller interacting with the camway so as to ensure the displacement of the movable element, wherein the machine also comprises a device for controlling the displacement of the movable element, wherein the countercam has at least one portion which is movable relative to the chassis, and wherein the control device incorporates a distance sensor that continuously measures the distance of a movable portion of the countercam relative to a fixed reference point on the chassis.

16 Claims, 4 Drawing Sheets

(51) Int. Cl.
*B29C 49/58* (2006.01)
*B29C 49/78* (2006.01)
*B29L 31/00* (2006.01)

(52) U.S. Cl.
CPC ........ *B29C 49/42384* (2022.05); *B29C 49/58* (2013.01); *B29C 49/78* (2013.01); *B29C 2049/5872* (2013.01); *B29C 2049/7878* (2022.05); *B29L 2031/712* (2013.01)

(56) References Cited

U.S. PATENT DOCUMENTS

| | | | |
|---|---|---|---|
| 7,849,996 B2* | 12/2010 | Leblond | B29C 49/4205 |
| | | | 198/377.07 |
| 8,807,981 B2* | 8/2014 | Cirette | B29C 33/305 |
| | | | 425/195 |
| 8,951,036 B2* | 2/2015 | Tsuchiya | B29C 71/0063 |
| | | | 425/534 |
| 10,377,074 B2* | 8/2019 | Cavallini | B29C 49/06 |
| 2004/0009257 A1 | 1/2004 | Galloni | |
| 2018/0154571 A1 | 6/2018 | Cavallini | |

FOREIGN PATENT DOCUMENTS

| | | | | |
|---|---|---|---|---|
| EP | 1980385 A1 | | 10/2008 | |
| FR | 3068683 B1 | * | 7/2019 | ......... B29C 49/4205 |
| JP | 6366346 A | | 3/1988 | |

* cited by examiner

DEVICE FOR CONTROLLING THE MOVEMENT OF A MOVABLE ELEMENT FOR A MACHINE FOR MANUFACTURING PLASTIC RECEPTACLES

The field of the invention is that of the design and manufacture of plastic container manufacturing machines.

More specifically, the invention relates to a device for controlling the displacement of a movable element of the manufacturing machine.

Plastic containers are obtained from preforms which are deformed by blow molding or stretch blow molding so as to reach their final shape.

More particularly, the preforms are heated until their constituent material reaches a glass transition temperature at which the plastics material is malleable enough to be stretched without tearing.

The molded containers are then transferred to processing units, in which they are decontaminated, filled, capped and labelled, for example.

The processing units generally comprise at least one element which is movable relative to a chassis of the manufacturing machine, this movable element being generally intended to come into contact with part of the container, or, at the very least, into the immediate vicinity thereof.

Some processing units utilize pressurized air. This is in particular the case for the blow molding unit that allows the injection of air into the preform so as to stretch out its constituent material.

The air is injected by a nozzle into the preform, this nozzle being movable relative to a mold in which the preform to be blow molded is received.

However, the molds comprise at least one movable part allowing the insertion of a preform and the withdrawal of a blow-molded container, that is to say a molded container.

The displacement of the movable element is generally brought about by the use of a camway which interacts with a roller.

To make it possible to manufacture the containers properly, the closure of the molds and the positioning of the nozzle are controlled.

A first control technique is done by ear.

In this technique, the operators listen out for unusual noise coming from the manufacturing machine. If appropriate, the operators can stop the machine to intervene and repair it.

However, this technique has a major drawback.

In effect, the assessment of the noise is specific to each individual and requires greatly experienced operators. Consequently, from one and the same noise that is heard, some operators can decide to stop the machine while others will let the production cycles proceed.

Moreover, by ear, it is difficult to identify what element is the one implicated in generating the unusual noise.

In addition, when the operators hear an unusual noise, this means that the machine has a breakdown and that it must be stopped in order to carry out a maintenance task. In other words, the intervention of maintenance is carried out when a part on the machine is broken, or practically broken, this entailing a part changing cost that is greater than a repair cost (when, of course, the part, before it breaks, can still be repaired).

This also means that the manufacturing machine is not utilized and therefore is not profitable for its owner.

To overcome this drawback, a second technique has been developed.

This second technique has the aim in particular of allowing predictive maintenance, which is less expensive than remedial maintenance.

This is because predictive maintenance makes it possible to limit the downtime of the machine and therefore to reduce the costs linked with non-utilization of the machine.

This second technique consists in using vibration sensors positioned on the machine. The signals generated by the sensors are then processed so as to perform a vibratory analysis and detect a repeatability of the signal that corresponds to a "normal" cycle. This analysis of the signal is then complex and increases the processing burden of a computer unit of the manufacturing machine.

When the signals are analyzed and a deviation from a normal signal is detected, then the operators can anticipate breakage of a part of the machine and plan a maintenance step.

Although this second technique is satisfactory regarding the downtime of the machine, it is nevertheless not without drawbacks.

This is because the vibration sensors have a significant cost.

Moreover, the container manufacturing machines are large machines that have multiple grouped processing units.

Therefore, the vibrations generated by a processing unit can be apparent in another processing unit.

So, during the vibratory analysis, it is necessary to clean the signal examined, that is to say to eliminate from it the "noise" that degrades the signal.

In other words, the parasitic vibrations linked to an adjacent unit are weakened so as to obtain a usable signal from the single element which must be controlled.

Such cleaning is both expensive and time-consuming and so it makes this second technique both long and less precise if the processing time is reduced to promote production rates.

A third technique consists in the use of on/off sensors. This type of sensor is less expensive than the vibration sensors but cannot be applied to predictive maintenance.

This is because these sensors make it possible to detect correct positioning or incorrect positioning of the movable element. If it is an incorrect movement that is detected, this means that it is too late and that the maintenance to be performed is not predictive but remedial.

This third technique thus amounts to an automation of the first technique, but still has its main drawback.

In particular, the aim of the invention is to remedy the drawbacks of the prior art.

More specifically, the aim of the invention is to allow the machine to be controlled in order to avoid excessive damage to the machine and to perform predictive maintenance operations.

The aim of the invention is also to make it possible to anticipate a risk of failure of the manufacturing machine.

The aim of the invention is in addition to allow manufacturing modules to be monitored throughout the manufacture.

These objectives, and others which will become apparent below, are achieved by virtue of the invention, the subject of which is a plastic container manufacturing machine, comprising:

a chassis having a camway with a cam and a countercam;

an element which is movable relative to the chassis, bearing a roller interacting with the camway so as to ensure the displacement of the movable element, the machine also comprising a device for controlling the displacement of the movable element, wherein the countercam has at least one portion which is movable relative to the chassis, the control device incorporating a distance sensor that continuously measures the distance of the movable portion of the countercam relative to a fixed reference point on the chassis, and wherein the machine comprises a computer unit coupled to the sensor, the computer unit being parametrized to identify, for each cycle, a variation in the displacement of the movable portion of the countercam relative to a predetermined displacement, to compare said variation to a range of authorized variations, and to send a warning when said variation is outside of the authorized range.

The continuous measurement of the distance of the movable portion of the countercam relative to a fixed reference point on the chassis makes it possible to detect a drift in the displacement of the movable element.

This drift, which is generally the sign of future breakage of a part of the manufacturing machine, can then be corrected by replacing parts, or better repairing them, making it possible to eliminate the drift detected.

However, if the drift remains slight and constant, this makes it possible to identify a simple misalignment of the manufacturing machine or the necessity of a maintenance operation for lubricating an element, for example, it being possible to perform such a misalignment or such a lubrication the next time the manufacturing machine is stopped for maintenance.

The use of a distance sensor makes it possible to obtain a noiseless signal which can be utilized more easily than the signals obtained in the prior art by means of vibration sensors, for example.

Advantageously, the sensor is of the inductive type.

The use of an inductive sensor makes it possible to do away with some constraints linked to the operation of the manufacturing machine.

This is because the lubricant of the machine, the dust or the humidity do not adversely affect the use of a sensor of the inductive type.

As a variant, the sensor is of the optical type.

Such a sensor makes it possible to obtain a precise measurement of the displacement of the movable portion of the countercam relative to the chassis.

According to a first particular embodiment, the movable portion of the countercam has an aperture, the sensor being fixed on the chassis and positioned inside the aperture.

Such a configuration makes it possible to make the control device compact, in particular by integrating it into an existing but unused volume, for example.

In addition, the positioning of the sensor in the aperture makes it possible to protect the sensor from external elements (lubricant, dust, etc.) and impacts, for example with another movable or fixed element of the manufacturing machine.

According to a second particular embodiment, the sensor is integral with the movable portion of the countercam.

This configuration makes it possible to follow, likewise precisely, the position of the movable portion of the countercam relative to the chassis.

Moreover, when the sensor is integral with the movable portion of the countercam, it faithfully follows the movement transferred to the movable portion by the roller, even low-intensity movements.

The invention also relates to a method for detecting a risk of displacement failure of an element which is movable relative to a chassis of a container manufacturing machine as described above, wherein it comprises, for each manufacturing cycle, the following steps:

establishing a distance curve between the movable portion of the countercam and the fixed reference point on the chassis;

identifying a deviation between the distance curve established and a predetermined distance curve;

comparing the deviation with a range of authorized variations;

sending a warning if the deviation is outside the range of authorized variations.

Such a method makes it possible to carry out predictive maintenance steps, since the machine can be adjusted or maintained during a planned stoppage of the manufacturing machine. Moreover, this method makes it possible to validate the adjustment and/or the maintenance action that are carried out.

The downtime of the machine for maintenance reasons can therefore be reduced and the maintenance costs decreased in comparison with the costs of remedial maintenance.

Advantageously, the method also comprises a step of identifying a deviatory recurrence, throughout which the deviation of the analyzed cycle is compared with a previous cycle deviation series so as to detect an increasing deviatory drift.

The identification of a deviatory recurrence makes it possible to dismiss a one-off deviation of the movement of the movable portion of the countercam.

This is because although the presence of a defective container can cause the movement of the countercam to deviate over a single cycle, such a deviation does not require any particular maintenance.

According to one embodiment, the warning consists in transmitting a sound effect or a message to a production operator.

Such a sound effect or message can be perceived by an operator without them needing to be close to the machine.

The latter can then move to the machine that has emitted the signal and monitor its operation or even carry out a maintenance step if necessary.

According to another embodiment, the warning consists in an instruction to stop the manufacturing machine.

Such an instruction makes it possible to safeguard the manufacturing machine in order to avoid significant breakage of the machine. In other words, the stoppage of the machine makes it possible to carry out predictive maintenance before it is too late and before the breakage of a part completely damages the machine and necessitates remedial maintenance.

As a variant, the warning can be both an instruction to stop the manufacturing machine and the transmission of a sound effect or a message to a production operator.

Other features and advantages of the invention will become more clearly apparent on reading the following description of preferential embodiments of the invention, which are given by way of illustrative and nonlimiting example, and the appended drawings in which.

Figure 1:
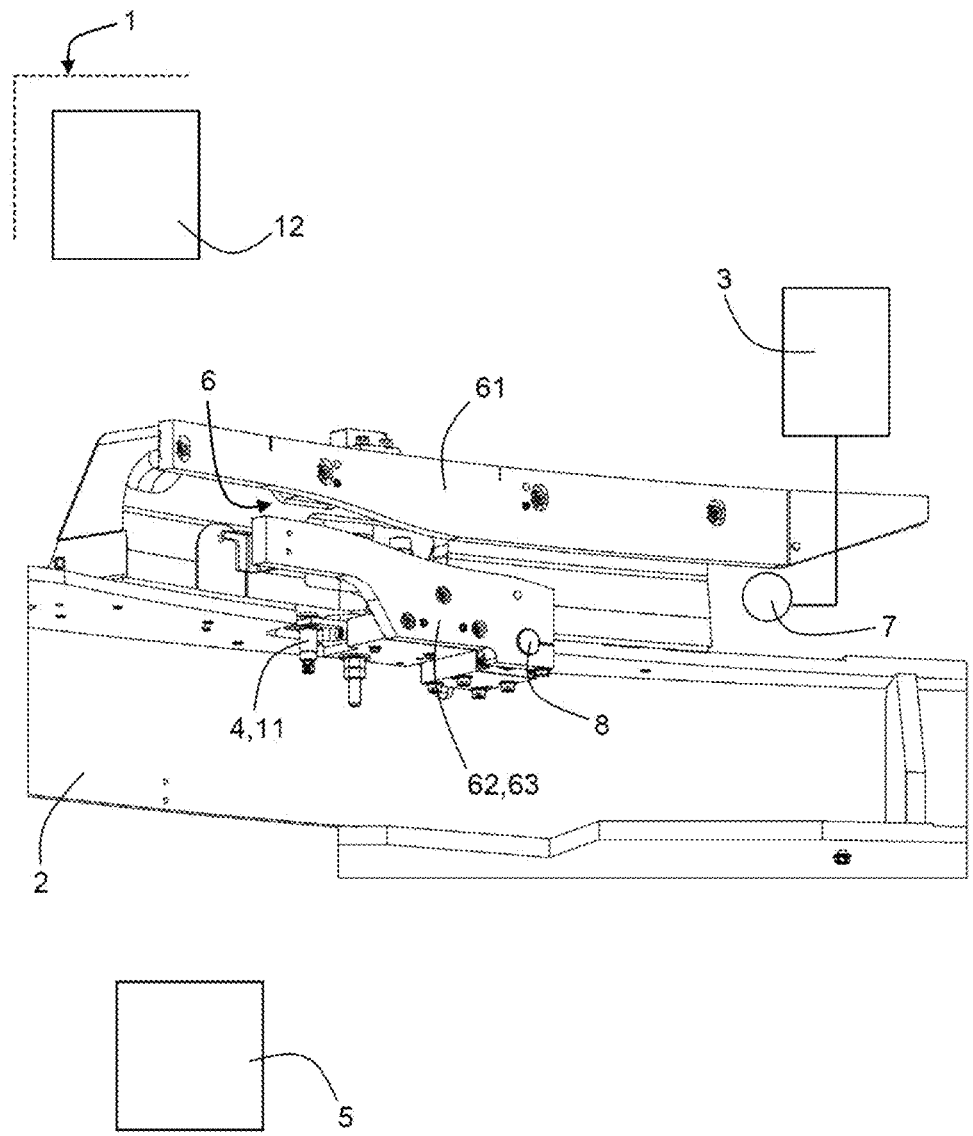
FIG. 1 is a detail view of part of a manufacturing machine according to the invention, according to a first embodiment.

FIG. 1 schematically illustrates a plastic container manufacturing machine 1, according to the invention.

Such a machine 1 comprises:
- a chassis 2;
- an element 3 which is movable relative to the chassis 2;
- a device 4 for controlling the displacement of the movable element 3; and
- a computer unit 5.

Figure 2:
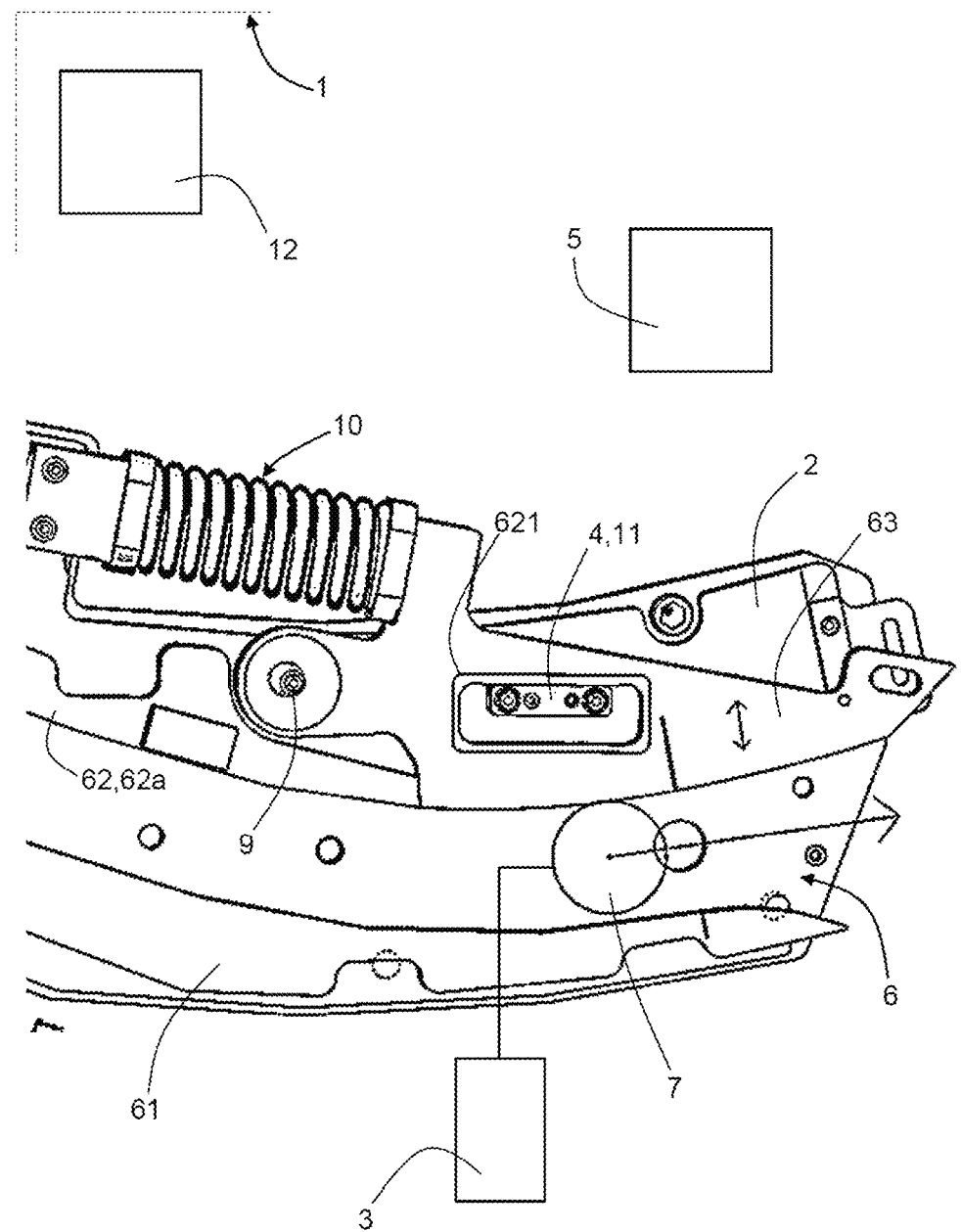
FIG. 2 is a detail view of part of a manufacturing machine according to the invention, according to a second embodiment.

With reference to FIGS. 1 and 2, the chassis 2 comprises a camway 6 having:
- a cam 61;
- a countercam 62.

The camway 6 makes it possible to control the displacement of the movable element 3 as described below.

For this, the movable element 3 bears a roller 7 which interacts with the camway 6.

More specifically, the roller 7 comes into contact with the cam 61 and then, at the end of the camway 6, into contact with the countercam 62.

In order to control the proper displacement of the movable element 3, the countercam has at least one portion 63 which is movable relative to the chassis 2.

According to a first embodiment illustrated in FIG. 1, the movable portion 63 and the countercam 62 are in one piece. In other words, the countercam 62 is fully movable relative to the chassis 2 about a first pivot 8.

According to a second embodiment illustrated in FIG. 2, the movable portion 63 is formed by one end of the countercam 62. A first part 62a of the countercam 62 is then fixed relative to the chassis 2, the movable portion 63 pivots relative to the first portion, and therefore relative to the chassis 2, about a second pivot 9.

In this second embodiment, the movable portion 63 is held in a guiding position by return means 10 which have a tendency to push the movable portion 63 back into the continuation of the first part of the countercam 62. Return means may also be present for the first embodiment.

Expressed differently, in the guiding position, the movable portion 63 has a guiding surface of the roller 7 that is tangent to a guiding surface of the first part of the countercam 62.

The device 4 for controlling the displacement of the movable element 3 incorporates a distance sensor 11 that continuously measures the distance of the movable portion 63 of the countercam 62 relative to a fixed reference point on the chassis 2.

According to a first embodiment, the sensor 11 is of the inductive type.

According to a second embodiment, the sensor 11 is of the optical type.

With reference to FIG. 1, which illustrates the first embodiment, the sensor 11 is integral with the movable portion 63 of the countercam 62.

In the example illustrated with reference to FIG. 1, the sensor 11 is integral with the countercam 62, since the countercam 62 and the movable portion 63 are in one piece.

The sensor 11 thus follows the movement of the countercam 62 and continuously measures the distance separating it from the chassis 2.

In this instance, the reference point on the chassis 2 is then movable relative to the sensor since the rotational movement of the countercam 62 and the integrality of the sensor 11 on the countercam 62 bring about a circular displacement of the sensor 11.

With reference to FIG. 2, which illustrates the second embodiment, the sensor 11 is integral with the chassis 2 and is housed in the movable portion 63 of the countercam 62.

More specifically, the movable portion 63 of the countercam 62 has an aperture 621, the sensor 11 being fixed on the chassis 2 and positioned inside the aperture 621.

In this instance, the reference point on the chassis 2 is then formed by the sensor 11 itself, which then continuously measures its distance relative to an edge of the aperture 621.

During operation, when the roller 7 bears against and displaces the movable portion 63, the sensor 11 is spaced apart from a wall of the aperture 621 and records this distance continuously. When the roller 7 no longer exerts a force on the countercam 62, the movable portion 63 then returns to its initial position, that is to say in the continuation of the first part of the countercam 62.

The computer unit 5 is coupled to the distance sensor 11, and is parametrized to identify, via a method described below, a deviation of the displacement of the movable element 3.

More specifically, the computer unit 5 is parametrized to identify, for each cycle, a variation in the displacement of the movable portion 63 of the countercam 62 relative to a predetermined displacement, to compare said variation to a range of authorized variations, and to send a warning when said variation is outside of the range of authorized variations.

The method is a method for detecting a risk of displacement failure of the movable element 3 relative to the chassis 2 of the container manufacturing machine 1.

This method comprises, for each manufacturing cycle, the following steps:
- establishing a distance curve between the movable portion 63 of the countercam 62 and the fixed reference point on the chassis 2, as a function of time for example;
- identifying a deviation between the distance curve established and a predetermined distance curve;
- comparing the deviation with a range of acceptable variations;
- sending a warning if the deviation is outside the range of authorized variations.

Figure 3:
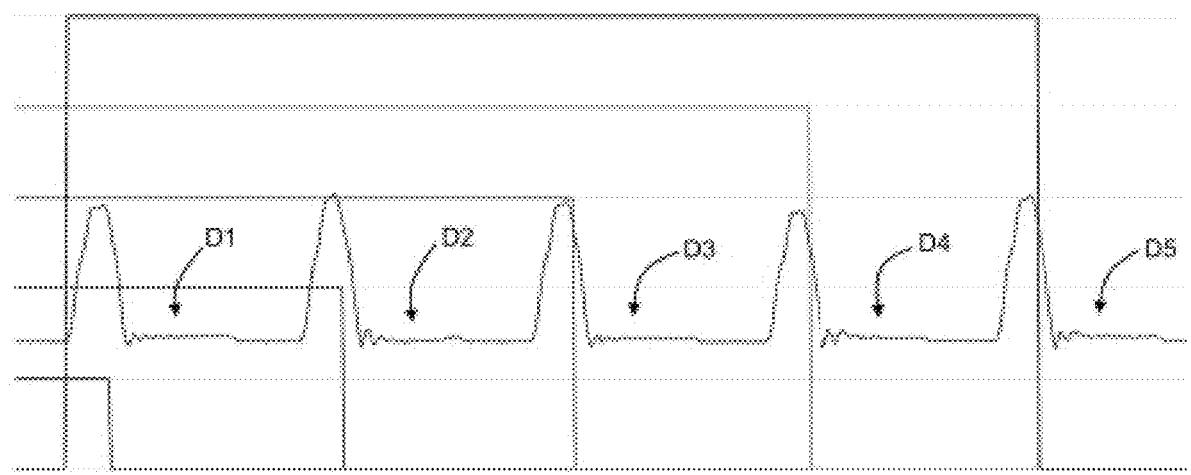
FIG. 3 is a control diagram of the displacement of a movable element of the manufacturing machine according to the invention, over multiple successive cycles in normal operating conditions.
Figure 4:
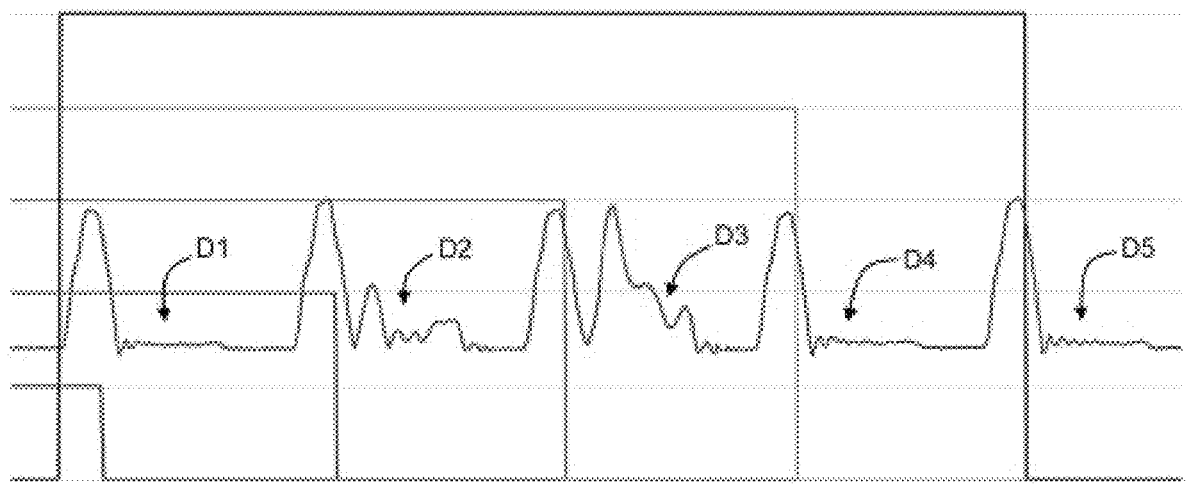
FIG. 4 is a control diagram of the displacement of a movable element of the manufacturing machine according to the invention, over multiple successive cycles in abnormal operating conditions.

FIGS. 3 and 4 illustrate a series of distance curves between the movable portion 63 of the countercam 62 and the fixed reference point on the chassis 2.

More specifically, FIGS. 3 and 4 illustrate the displacement D1, D2, D3, D4, D5 of five different movable elements 3 on one and the same camway 6.

In FIG. 3, all of the displacements D1, D2, D3, D4, D5 are normal, that is to say that no deviation can be seen, and these curves form in particular the predetermined distance curves.

By contrast, in FIG. 4, the displacements D2 and D3 have an anomaly.

This is because, in comparison with the curves D2 and D3 of FIG. 3, the signal transmitted by the sensor 11 has significant variations, which is a sign of a deviation in the displacement of the movable elements 3.

The computer unit 5 therefore must transmit this information to the production operators.

For this, the machine 1 comprises a signaling system 12, comprising for example a screen, a loudspeaker and/or a light signal.

When the computer unit 5 detects a deviation, it therefore controls the signaling system 12 in order to warn the production operators.

To that end, the warning may consist in the transmission of a sound effect via the loudspeaker, if appropriate coupled to a light signal, or of a message to a production operator via the screen, for example.

For enhanced precision, the method also comprises a step of identifying a deviatory recurrence, throughout which the deviation of the analyzed cycle is compared with a previous cycle deviation series so as to detect an increasing deviatory drift.

This makes it possible in particular to verify that the anomaly or anomalies observed on the curves D1, D2, D3, D4, D5 are not isolated cases, for example as a result of the temporary presence of a defective container.

In the event of significant deviation, for example, the warning consists in an instruction to stop the manufacturing machine 1.

This makes it possible in particular to avoid any risk of irreversible damage to the manufacturing machine 1.

By virtue of the production machine 1 and of the method which have been described, it is possible to monitor possible misalignment of the machine 1 and to proceed with predictive maintenance before significant breakage of the machine 1.

In addition, the method makes it possible to monitor the development of the misalignment and possibly to identify a cause of the misalignment.

The invention claimed is:

1. A plastic container manufacturing machine, comprising:
    a chassis having a camway with a cam and a countercam;
    an element which is movable relative to the chassis, the element bearing a roller interacting with the camway so as to cause displacement of the movable element; and
    a device for controlling the displacement of the movable element,
    wherein the countercam has at least one portion which is movable relative to the chassis, the control device comprising a distance sensor that continuously measures the distance of the movable portion of the countercam relative to a fixed reference point on the chassis, and
    wherein the machine further comprises a computer unit coupled to the sensor, the computer unit being parametrized to identify, for each cycle of the machine, a variation in the displacement of the movable portion of the countercam relative to a predetermined displacement, to compare said variation to a range of predetermined authorized variations, and to generate a warning when said variation is outside of the range of authorized variations.

2. The manufacturing machine as claimed in claim 1, wherein the sensor is an inductive sensor.

3. The manufacturing machine as claimed in claim 2, wherein the movable portion of the countercam has an aperture, the sensor being fixed on the chassis and positioned inside the aperture.

4. The manufacturing machine as claimed in claim 2, wherein the sensor is integral with the movable portion of the countercam.

5. The manufacturing machine as claimed in claim 1, wherein the sensor is an optical sensor.

6. The manufacturing machine as claimed in claim 5, wherein the movable portion of the countercam has an aperture, the sensor being fixed on the chassis and positioned inside the aperture.

7. The manufacturing machine as claimed in claim 5, wherein the sensor is integral with the movable portion of the countercam.

8. The manufacturing machine as claimed in claim 1, wherein the movable portion of the countercam has an aperture, the sensor being fixed on the chassis and positioned inside the aperture.

9. The manufacturing machine as claimed in claim 1, wherein the sensor is integral with the movable portion of the countercam.

10. A method for detecting a risk of displacement failure of a portion of a countercam which is movable relative to a chassis of a container manufacturing machine as claimed in claim 1,
wherein for each manufacturing cycle of the machine, the method comprises:
    generating a distance curve between the movable portion of the countercam and the fixed reference point on the chassis;
    identifying a deviation between the distance curve and a predetermined distance curve;
    comparing the deviation with a range of predetermined authorized variations; and
    generating a warning if the deviation is outside the range of authorized variations.

11. The method as claimed in claim 10, wherein identifying a deviation further comprises identifying a deviatory recurrence, throughout which the deviation of a respective one of the manufacturing cycles is compared with a deviation series from a previous one of the manufacturing cycles so as to detect an increasing drift of the deviation.

12. The method as claimed in claim 11, wherein the warning comprises a sound effect or a message transmitted to a production operator of the machine.

13. The method as claimed in one of claim 11, wherein the warning comprises an instruction to stop the manufacturing machine.

14. The method as claimed in claim 10, wherein the warning comprises a sound effect or a message transmitted to a production operator of the machine.

15. The method as claimed in one of claim 14, wherein the warning comprises an instruction to stop the manufacturing machine.

16. The method as claimed in one of claim 10, wherein the warning comprises an instruction to stop the manufacturing machine.

* * * * *